(12) United States Patent
Nishimura et al.

(10) Patent No.: US 8,522,633 B2
(45) Date of Patent: Sep. 3, 2013

(54) TRANSMISSION AND MEASURING INSTRUMENT

(75) Inventors: Yasunori Nishimura, Suzano (BR); Augusto Minagawa, Suzano (BR)

(73) Assignee: Mitutoyo Corporation, Kawasaki (JP)

( * ) Notice: Subject to any disclaimer, the term of this patent is extended or adjusted under 35 U.S.C. 154(b) by 703 days.

(21) Appl. No.: 12/576,574

(22) Filed: Oct. 9, 2009

(65) Prior Publication Data
US 2010/0113212 A1 May 6, 2010

(30) Foreign Application Priority Data

Oct. 31, 2008 (JP) ................. 2008-281560

(51) Int. Cl.
*G01B 5/20* (2006.01)
*F16H 13/08* (2006.01)

(52) U.S. Cl.
USPC .......................................... 74/89.2; 475/196

(58) Field of Classification Search
USPC .................. 476/36; 475/196; 74/89.2, 89.22
See application file for complete search history.

(56) References Cited

U.S. PATENT DOCUMENTS

| | | | |
|---|---|---|---|
| 1,986,177 A * | 1/1935 | Zastoupil ...................... | 475/196 |
| 4,583,415 A * | 4/1986 | Locker ............................ | 476/64 |

FOREIGN PATENT DOCUMENTS

| | | | |
|---|---|---|---|
| JP | A-S50-22970 | | 3/1975 |
| JP | 58-46252 | * | 3/1983 |
| JP | U-H05-77713 | | 10/1993 |
| JP | A-2000-199532 | | 7/2000 |
| JP | A 2005-300318 | | 10/2005 |

OTHER PUBLICATIONS

Japanese Patent Office, Notification of Reasons for Refusal issued Apr. 17, 2012 in Japanese Patent Application No. 2008-281560 w/English-language Translation.

* cited by examiner

*Primary Examiner* — William C Joyce
(74) *Attorney, Agent, or Firm* — Oliff & Berridge, PLC

(57) ABSTRACT

A transmission 7 includes three ball bearings 81A, 81B, 81C, an input shaft 74, an output holding member 83, and an output shaft 72. Each of the ball bearings 81A, 81B, 81C has an inner race, an outer race, and a plurality of rolling elements. The input shaft 74 has an insertion portion inserted into the inner race, and is rotated about the rotation axis of the ball bearing 81A, thereby rotating the inner race. When the inner race is rotated, the rolling elements roll in accordance with the rotation of the inner race. The output holding member 83 includes a holding portion 831 which is held by the rolling elements, and is rotated about the rotation axis of the ball bearing 81C in accordance with rolling of the rolling elements, whereby the output shaft 72 is rotated about the rotation axis of the ball bearing 81C.

5 Claims, 15 Drawing Sheets

TRANSMISSION AND MEASURING INSTRUMENT

BACKGROUND OF THE INVENTION

1. Field of the Invention

The present invention relates to a transmission, and a measuring instrument including the transmission.

2. Description of Related Art

It is known a measuring instrument including: a measuring element for measuring an object to be measured; and a moving mechanism which has a plurality of movement axes and moves the measuring element in directions of the movement axes (for example, see Japanese Patent Unexamined Publication JP-A-2005-300318).

In such a measuring instrument, the moving mechanism has a micro-motion mechanism for finely moving the measuring element in the movement axis directions. The micro-motion mechanism includes a transmission which reduces an input rotational speed and outputs the reduced rotational speed, and the measuring element is finely moved by the output of the transmission.

In a surface property measuring instrument disclosed in JP-A-2005-300318, specifically, the moving mechanism includes a column which is slidable in a certain movement axis. The measuring element is connected to the column, and moved in accordance with the slide movement of the column. The micro-motion mechanism includes: a handle which is to be rotated by the user to finely move the measuring element; a feed screw which is extended along the moving direction of the column and is coupled to the handle; and a nut which is screwed with the feed screw. The column is connected to the nut.

When the handle is rotated, the feed screw is rotated in accordance with the rotation of the handle, to move the nut. When the nut is moved, the measuring element is moved through the column. Namely, the micro-motion mechanism of the surface property measuring instrument disclosed in JP-A-2005-300318 reduces the speed by converting the rotational speed of the handle into the moving speed of the nut to thereby finely move the measuring element. In the micro-motion mechanism of the surface property measuring instrument disclosed in JP-A-2005-300318, a transmission has the feed screw and the nut, and its speed reduction ratio is determined by the pitch of the feed screw.

Further, as other type of the micro-motion mechanisms, there is known a linear action type in which a driving shaft connected to a handle is axially moved, and a measuring element is finely moved in accordance with the movement of the driving shaft.

Furthermore, there is known a worm gear type in which a gear is rotated through a worm gear connected to a handle, and a measuring element is finely moved in accordance with the rotation of the gear.

FIG. 14 is a diagram showing a micro-motion mechanism of the linear action type.

As shown in FIG. 14, the micro-motion mechanism 100 of the linear action type includes: a handle 101 which is to be rotated by the user to finely move a measuring element; a columnar driving shaft 103 which is connected to the handle 101 through a wire 102; a plurality of bearings 104 which are disposed so as to surround the driving shaft 103; and two supporting members 105 which are placed in the lower and upper sides in FIG. 14, respectively, and support the bearings 104. The measuring element is moved in accordance with movement of the driving shaft 103.

The bearings 104 are placed to abut against the surface of the driving shaft 103 in a state where the bearings are inclined by certain angle with respect to a plane perpendicular to the axis of the driving shaft 103.

When the handle 101 is rotated, the driving shaft 103 is rotated in accordance with the rotation of the wire 102, and axially moved by certain distance which corresponds to the inclinations of the bearings 104. Namely, the micro-motion mechanism 100 reduces the speed by converting the rotational speed of the handle 101 into the movement speed of the driving shaft 103, to finely move the measuring element. In the micro-motion mechanism 100, a transmission is configured by the driving shaft 103 and the bearings 104, and its reduction ratio is determined by the diameter of the driving shaft 103 and the inclinations of the bearings 104.

FIG. 15 is a diagram showing a micro-motion mechanism of the worm gear type.

As shown in FIG. 15, the micro-motion mechanism 110 of the worm gear type includes: a handle 111 which is rotated by the user to finely move a measuring element; a worm gear 113 which is connected to the handle 111 through a wire 112; and a gear 114 which meshes with the worm gear 113. A columnar shaft portion 114A having rotation axis which is the same as that of the gear 114 is formed on the gear 114.

The micro-motion mechanism 110 further includes: a bearing 115 which is opposed to the shaft portion 114A of the gear 114; a supporting member 116 which supports the bearing 115; an urging member 118 which is connected to the supporting member 116 and a fixing portion 117; and a columnar guide rail 119 which is placed between the shaft portion 114A of the gear 114 and the bearing 115 and is extended along a certain movement axis direction. The measuring element is moved in accordance with movement of the micro-motion mechanism 110.

The supporting member 116 is a plate-like member which is formed into a substantially T-like shape in a plan view. The bearing 115 is fixed to an end portion of the member which is in the right side in FIG. 15, and the urging member 118 is connected to an end portion of the member which is in the lower side in FIG. 15. In the supporting member 116, a substantially middle portion is fixed by a pin 116A, so that the supporting member is rotatable about the pin 116A.

The urging member 118 urges the lower end portion of the supporting member 116 toward the fixing portion 117. Namely, rotational force which is counterclockwise in FIG. 15 about the pin 116A is applied to the supporting member 116. Therefore, the guide rail 119 is clamped by the shaft portion 114A of the gear 114 and the bearing 115.

When the handle 111 is rotated, the worm gear 113 is rotated in accordance with the rotation of the wire 112, and the gear 114 is rotated in accordance with the rotation of the worm gear 113. When the gear 114 is rotated, the shaft portion 114A and the bearing 115 are rotated, and the micro-motion mechanism 110 is moved along the axial direction of the guide rail 119. In the micro-motion mechanism 110, namely, the rotational speed of the handle 111 is reduced by converting into the movement speed of the micro-motion mechanism 110, to finely move the measuring element. In the micro-motion mechanism 110, a transmission has the worm gear 113 and the gear 114, and its reduction ratio is determined by the number of tooth of the worm gear 113 and the gear 114.

In the transmission of the micro-motion mechanism of the surface property measuring instrument disclosed in JP-A-2005-300318, or that of the micro-motion mechanism 100, however, the axial length of the feed screw or the driving shaft 103 must be set according to the movable distance. In the case where the transmission is applied to a measuring instrument having a moving mechanism of a long movable distance, therefore, there arises a problem in that the size of the transmission is increased.

Further, in the transmission of the micro-motion mechanism of the surface property measuring instrument disclosed in JP-A-2005-300318, or that of the micro-motion mechanism 110, a feed screw must have high straightness, or the worm gear 113 and the gear 114 must be highly accurate, and hence there arises a problem in that the production cost is increased.

Furthermore, since the structure of the transmission of the micro-motion mechanism 110 is complicated, processes such as assembly and adjustment require a prolonged time period. Therefore, there arises a problem in that the production cost is further increased. When a transmission is configured by using gears as in the micro-motion mechanism 110, there is a further problem in that backlash occurs.

Still further, when a transmission is configured by using a wire as in the micro-motion mechanisms 100, 110, backlash is caused in accordance with the length and elasticity of the wire.

SUMMARY OF THE INVENTION

In view of the above problems, it is an object of the invention to provide a transmission and measuring instrument in which the size is not increased in accordance with the movable distance, and the production cost can be reduced.

According to an aspect of the invention, there is provided a transmission including:
a bearing including an inner race, an outer race, and a plurality of rolling elements housed between the inner race and the outer race;
an input shaft which has an insertion portion inserted into the inner race and is rotated about a rotation axis of the rolling bearing and rotates the inner race;
a holding member which includes a holding portion held by the rolling elements and is rotated about the rotation axis in accordance with rolling of the rolling elements; and
an output shaft which is connected to the holding member and is rotated about the rotation axis in accordance with rotation of the holding member.

According to the configuration, when the input shaft is rotated, the inner race is rotated in accordance with the rotation of the input shaft, and the rolling elements roll between the inner race and the outer race in accordance with the rotation of the inner race. That is, the rotational speed of the input shaft is converted into the rolling speed of the rolling elements. Here, the rolling speed of the rolling elements is made lower than the rotational speed of the input shaft.

Then, the rolling elements rotates, the holding member is rotated about the rotation axis of the rolling bearing in accordance with the rolling of the rolling elements, and the output shaft is rotated about the rotation axis of the rolling bearing in accordance with the rotation of the holding member. Thus, the rotational speed of the output shaft is made lower than that of the input shaft.

Here, the reduction ratio is determined by the diameters of the inner race, the outer race, and the rolling elements.

Since the transmission of the aspect of the invention outputs rotational motion, instead of the worm gear, the transmission of the aspect of the invention can be incorporated in the micro-motion mechanism 110 of the worm gear type. Therefore, since it is not necessary to employ such a long driving shaft of micro-motion mechanism 100 of the linear action type, the micro-motion mechanism employing the transmission of the aspect of the invention does not become large even if the required movable length is large.

Further, the transmission of the aspect of the invention can be configured by using a general-purpose rolling bearing, and hence the production cost can be reduced. In the transmission, moreover, any wires or any gears are not used, and therefore backlash never occurs.

According to another aspect of the invention, it is preferable that
plurality of the rolling bearings are provided so as to oppose each other in the rotation axis
the holding member includes:
an output holding member to which the output shaft is connected; and
link holding members which are provided among the rolling bearings, and
each of the link holding members including:
a holding portion which holds the rolling elements of one of the opposing rolling bearings; and
an insertion portion which is inserted into the inner race of the other of the opposing rolling bearing,
wherein the link holding member is rotated about the rotation axis and rotates the inner race of the other of the opposing rolling bearing.

According to this aspect, the rotational speed of the input shaft is reduced by each of the rolling bearings. That is, the reduction ratio can be adjusted by number of rolling bearing. Therefore, as compared with the case where the reduction ratio is adjusted by the diameters of the inner race, the outer race, and the rolling elements, according to the aspect of the invention, the reduction ratio can be largely changed.

According to still another aspect of the invention, it is preferable that
an outer diameter of the insertion portion is slightly larger than an inner diameter of the inner race and
the insertion portion is press-fitted into the inner race.

In a rolling bearing, a gap which is called a radial gap exists among the inner race, the outer race, and the rolling elements. Thus, there is a case where, even when the inner race is rotated in accordance with the rotation of the input shaft, the rolling elements slip and the output shaft cannot be rotated at an expected reduction ratio.

However, according to the aspect of the invention, when the insertion portion is inserted into the inner race, the inner race is slightly expanded and the rolling elements can be pressed by the inner race. When the inner race is rotated in accordance with the rotation of the input shaft, therefore, it is possible to suppress the rolling elements from slipping and the output shaft can be rotated at an expected reduction ratio.

According to still another aspect of the invention, it is preferable that the transmission further includes
a covering member which is substantially cylindrical shape so as to cover the outer race and is integrated with the outer race.

In the transmission of the aspect of the invention, when the outer race is rotated, the rolling elements roll between the inner race and the outer race in accordance with the rotation of the outer race. Namely, the rotational speed of the outer race is converted into the rolling speed of the rolling elements. The rolling speed of the rolling elements is equal to the rotational speed of the outer race. When the rolling elements roll, the holding member is rotated about the rotation axis of the rolling bearing in accordance with the rolling of the rolling elements, and the output shaft is rotated about the rotation axis of the rolling bearing in accordance with the rotation of the holding member. Therefore, the rotational speed of the output shaft is equal to that of the outer race.

According to the invention, the covering member is integrated with the outer race, and hence the outer race can be rotated by rotating the covering member. Even in the case where the transmission is configured by a plurality of rolling bearings, when the covering member is rotated, all of the outer races can be simultaneously rotated. When the input shaft is rotated, therefore, the rotational speed of the output shaft can be made lower than that of the input shaft, and, when the covering member is rotated, the rotational speed of the output shaft can be made equal to that of the outer race. In other words, in the transmission, the output shaft can be finely moved by rotating the input shaft and the output shaft can be coarsely moved by rotating the covering member.

According to still another aspect of the invention, there is provided a measuring instrument including:

a measuring element for measuring an object to be measured;

a moving mechanism for moving the measuring element; and the transmission which moves the measuring element in accordance with rotation of the output shaft.

DETAILED DESCRIPTION OF EXEMPLARY EMBODIMENTS OF THE PRESENT INVENTION

Hereinafter, an exemplary embodiment of the invention will be described with reference to the drawings.

[Basic Structure of Three-Dimensional Measuring Instrument]

Figure 1:
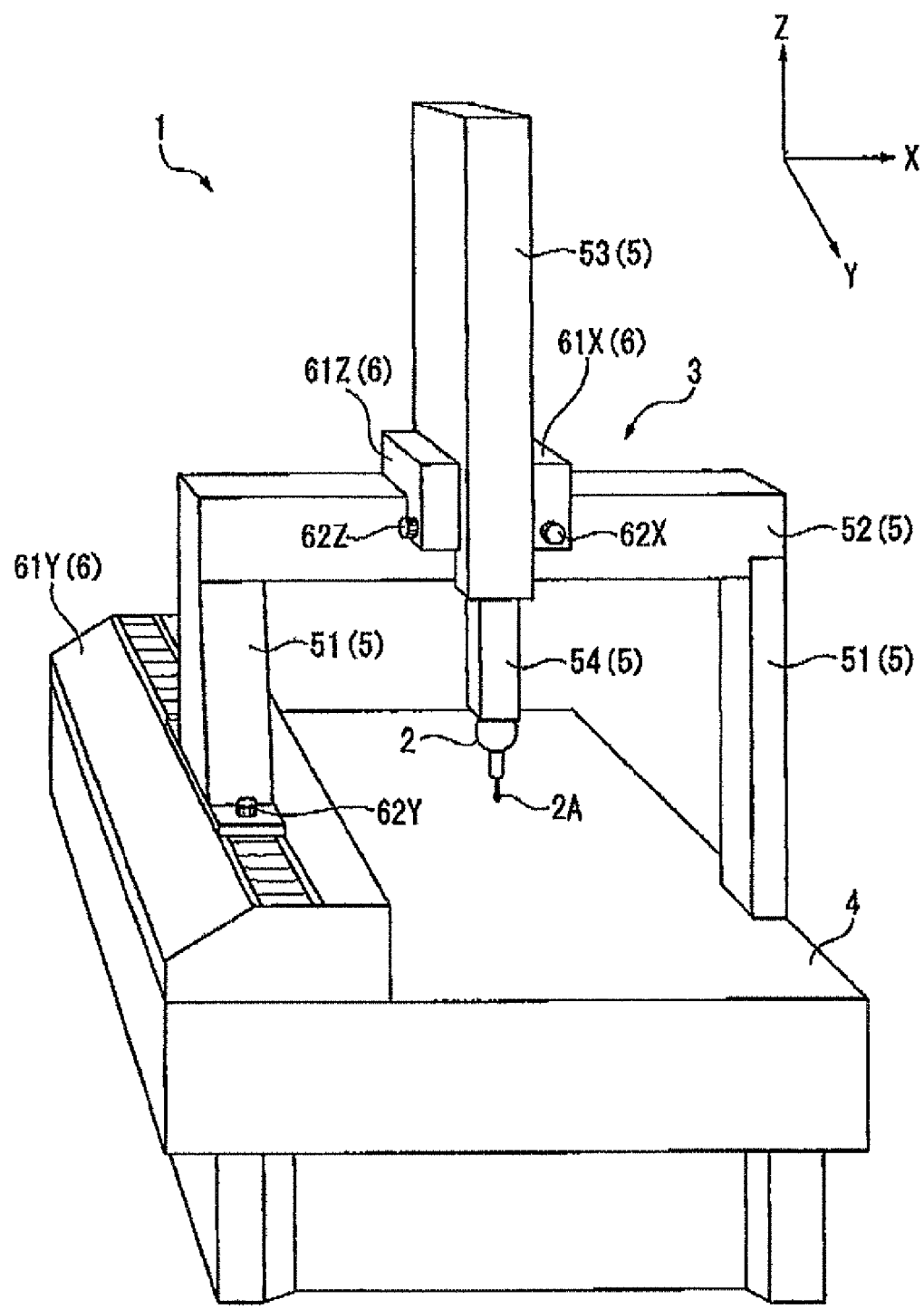
FIG. 1 is a diagram showing the whole of a three-dimensional measuring instrument of an embodiment of the invention.

FIG. 1 is a diagram showing the whole of a three-dimensional measuring instrument 1 which is an embodiment of the invention. In FIG. 1, description will be made while the upper direction is indicated as a +Z-axis direction, and two axes perpendicular to the Z-axis are indicated as X- and Y-axes, respectively. The same shall apply to the subsequent figures.

As shown in FIG. 1, the three-dimensional measuring instrument 1 includes: a probe 2 which has a measuring element 2A on the tip end side (the side of the −Z-axis direction); a moving mechanism 3 which holds the base end side (the side of the +Z-axis direction) of the probe 2 and moves the probe 2; and a surface plate 4 on which the moving mechanism 3 stands. Here, the measuring element 2A abuts against a surface of the measured object.

The moving mechanism 3 includes: a sliding mechanism 5 which holds the base end side of the probe 2 and enables the probe 2 to be slidingly moved; and a driving mechanism 6 which moves the sliding mechanism 5 to move the probe 2.

The sliding mechanism 5 includes: two beam supporting members 51 which are extended in the +Z-axis direction from the both ends of the surface plate 4 in the X-axis direction and are disposed to be slidable in the Y-axis direction; a beam 52 which is supported by the beam supporting members 51 and is extended in the X-axis direction; a column 53 which is formed into a rectangular tubular shape extending in the Z-axis direction and is disposed to be slidable on the beam 52 in the X-axis direction; and a rectangular tubular spindle 54 which is inserted into the column 53 and is disposed to be slidable in the column 53 in the Z-axis direction.

Therefore, the moving mechanism 3 has a plurality of movement axes in which the probe 2 is moved in the X-, Y-, and Z-axis directions. The spindle 54 holds the base end side of the probe 2 in an end portion on the side of the −Z-axis direction. Plural kinds of probes are prepared as the probe 2, and one of the probes can be selected to be held by the spindle 54.

The driving mechanism 6 includes: a Y-axis driving portion 61Y which supports the −X-axis direction beam supporting member 51 of the beam supporting members 51 and slidingly moves the supporting member in the Y-axis direction; an X-axis driving portion 61X which is slid on the beam 52 to move the column 53 in the X-axis direction; and a Z-axis driving portion 61Z which is slid in the column 53 to move the spindle 54 in the Z-axis direction. In accordance with instructions from a host computer connected to the three-dimensional measuring instrument 1, for example, the driving portions 61X, 61Y, 61Z drive the beam supporting members 51, the column 53 and the spindle 54.

The driving portions 61X, 61Y, 61Z include an X-axis feeding mechanism 62X, Y-axis feeding mechanism 62Y and Z-axis feeding mechanism 62Z which perform fine feeding or coarse feeding on the beam supporting members 51, the column 53 and the spindle 54. In the following description, the Y-axis feeding mechanism 62Y and the Z-axis feeding mechanism 62Z will be described, and description of the X-axis feeding mechanism 62X will be omitted.

[Basic Structure of Feeding Mechanism]

Figure 2:
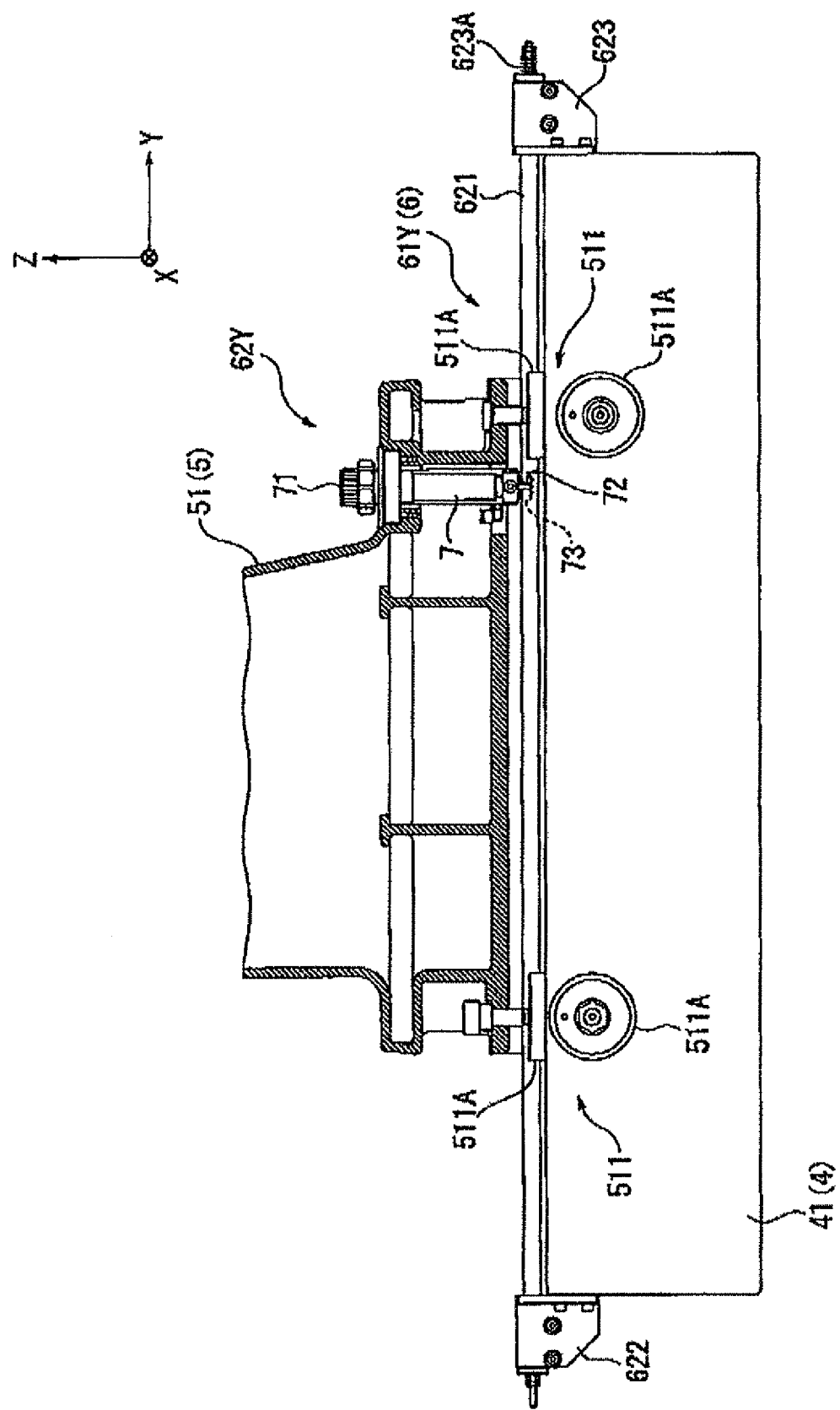
FIG. 2 is a view of a Y-axis feeding mechanism of the embodiment, as seen from the side of the −X-axis direction.
Figure 3:
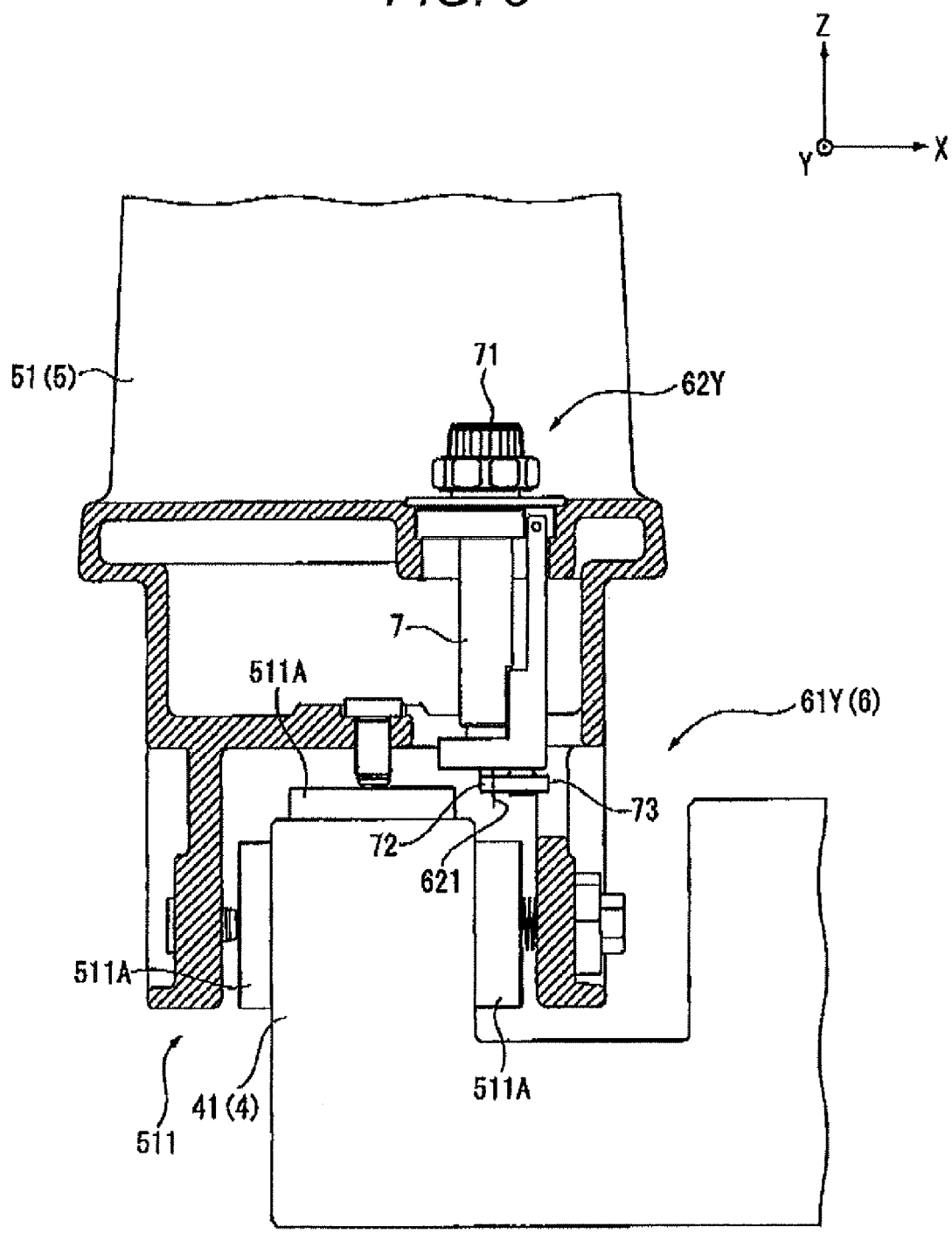
FIG. 3 is a view of the Y-axis feeding mechanism of the embodiment, as seen from the side of the +Y-axis direction.

FIG. 2 is a view of the Y-axis feeding mechanism 62Y as seen from the side of the −X-axis direction, and FIG. 3 is a view of the Y-axis feeding mechanism 62Y as seen from the side of the +Y-axis direction.

The Y-axis driving portion 61Y performs fine feeding or coarse feeding on the beam supporting member 51. As shown in FIGS. 2 and 3, the Y-axis driving portion 61Y includes: a convex portion 41 which is formed on the surface plate 4 in the Y-axis direction and has a rectangular sectional shape; and clamping portions 511 which are disposed in an end portion of the beam supporting member 51 in the −Z-axis direction and in the both ends in the Y-axis direction and clamp the convex portion 41.

Each of the clamping portions 511 includes three air pats 511A which are opposed to faces of the convex portion 41 on the sides of the −X-, +X-, and +Z-axis directions, respectively. The air pats 511A blow air against the convex portion 41 to reduce required driving force of the Y-axis driving portion 61Y which is exerted for moving the beam supporting member 51.

The Y-axis feeding mechanism 62Y includes: a feeding tape 621 which is placed between the convex portion 41 and the beam supporting member 51 and is stretched along the Y-axis direction; feeding-tape supporting portions 622, 623 which are disposed in the both ends of the convex portion 41 in the Y-axis direction; and a transmission 7.

The feeding-tape supporting portion 622 is fixed to an end portion of the convex portion 41 in the −Y-axis direction and supports the feeding tape 621. The feeding-tape supporting portion 623 is fixed to an end portion of the convex portion 41 in the +Y-axis direction, supports the feeding tape 621, and applies a tension to the feeding tape 621 by a spring 623A.

Figure 4:
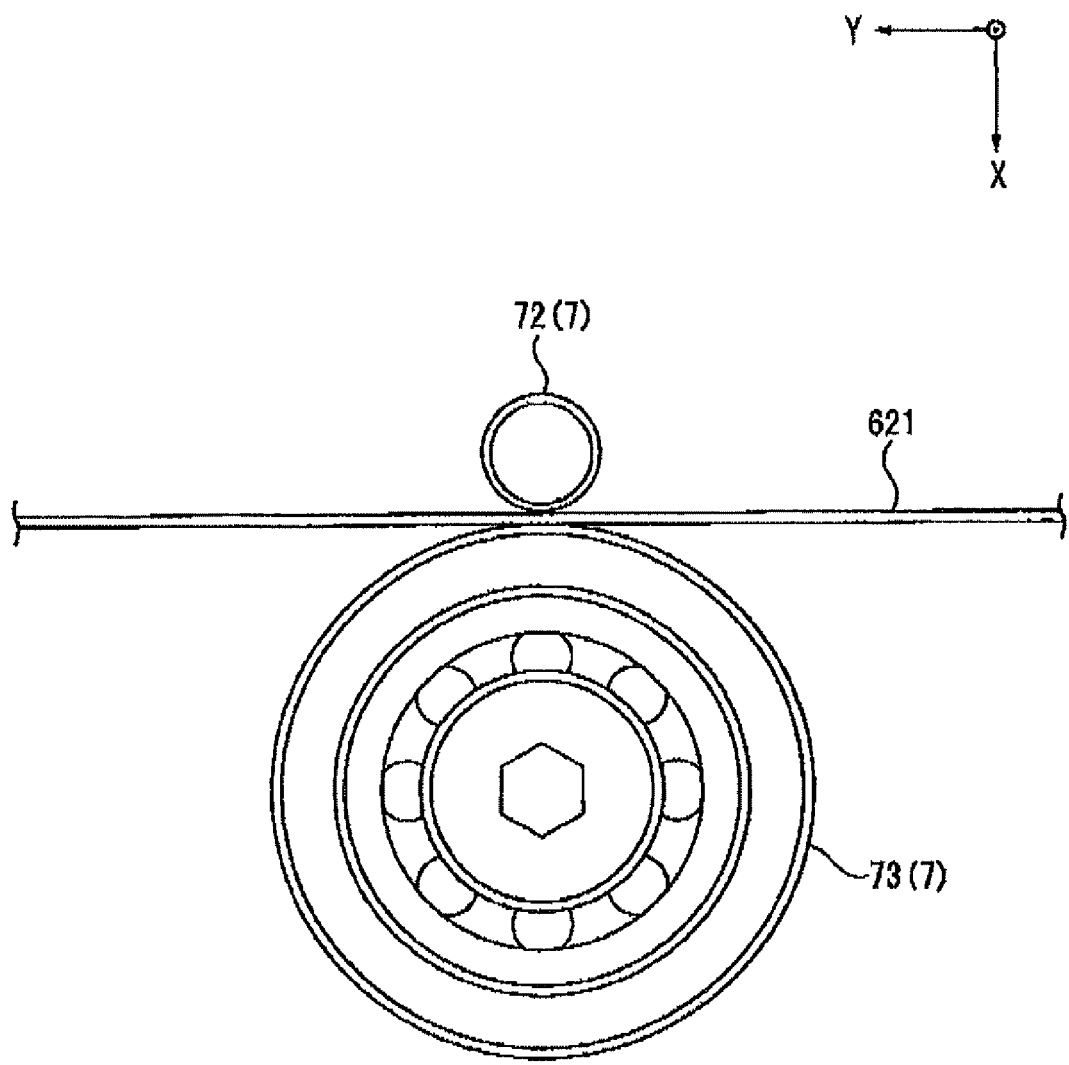
FIG. 4 is an enlarged view showing a connection state of a feeding tape and a transmission of the embodiment.

FIG. 4 is an enlarged view showing a connection state of the feeding tape 621 and the transmission 7.

As shown in FIGS. 2 to 4, the transmission 7 includes: a handle 71 which is exposed from the beam supporting member 51; an output shaft 72 which is rotated in accordance with rotation of the handle 71 and has a substantially columnar shape; and a ball bearing 73 which is opposed to the output shaft 72 in a radial direction and has a rotation axis that is substantially parallel to the rotation axis of the output shaft 72. In the transmission 7, the output shaft 72 and the ball bearing 73 clamp the feeding tape 621, thereby connecting the transmission to the feeding tape 621. When the output shaft 72 is rotated in accordance with the rotation of the handle 71, the ball bearing 73 is also rotated in accordance with the rotation of the output shaft 72 and the beam supporting member 51 is moved along the Y-axis direction.

Figure 5:
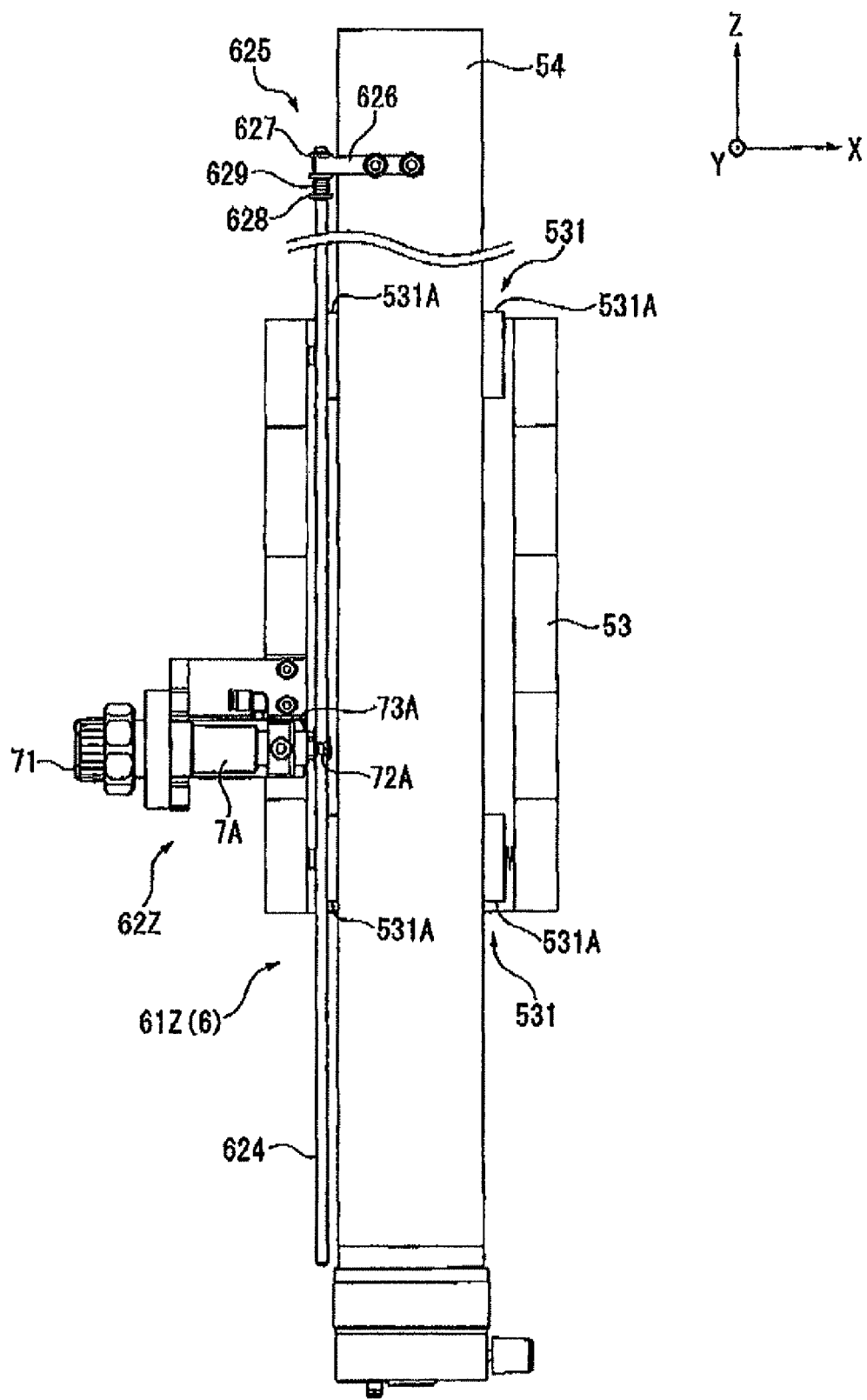
FIG. 5 is a view of a Z-axis feeding mechanism of the embodiment, as seen from the side of the +Y-axis direction.
Figure 6:
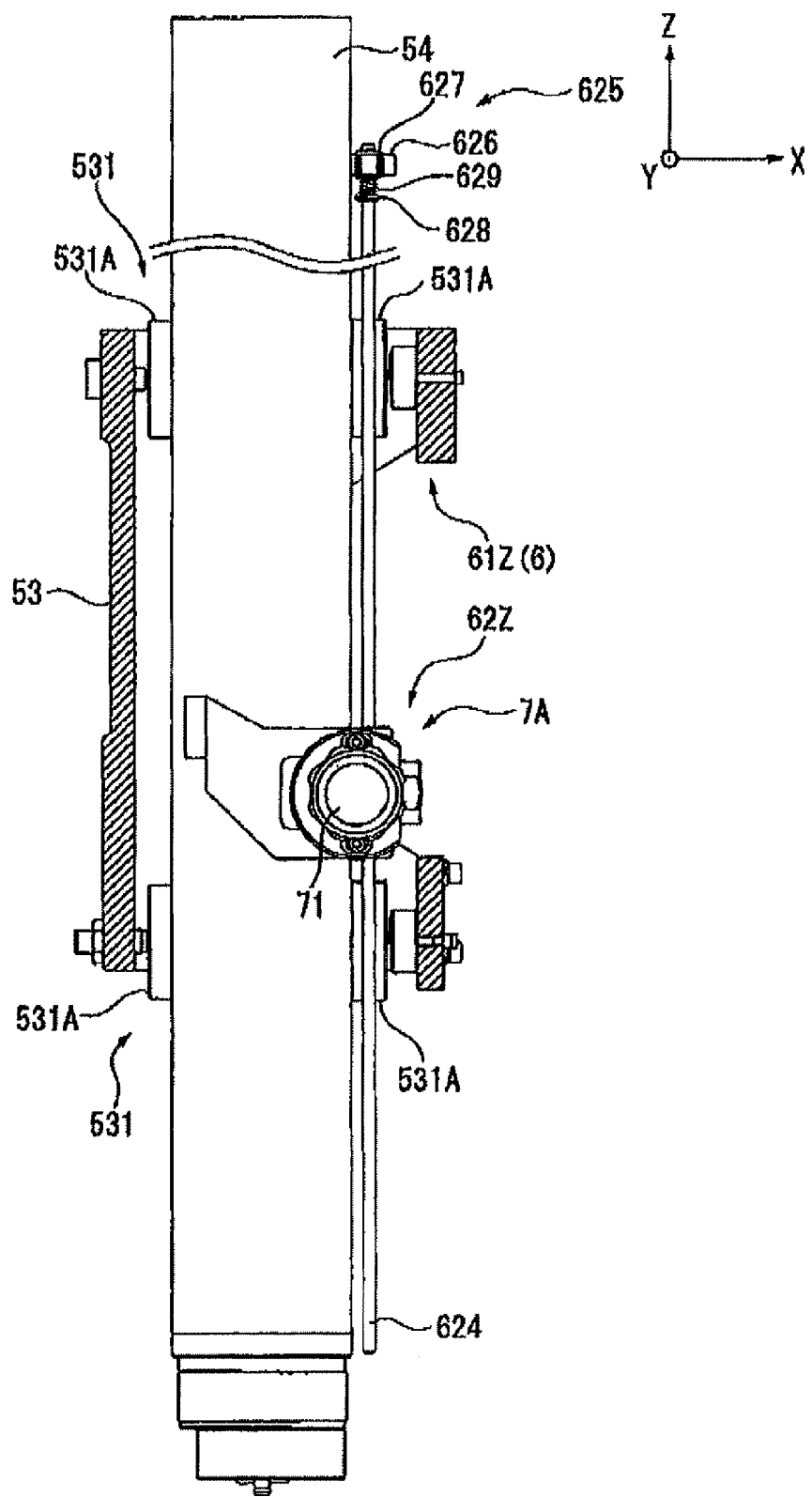
FIG. 6 is a view of the Z-axis feeding mechanism of the embodiment, as seen from the side of the −X-axis direction.

FIG. 5 is a view of the Z-axis feeding mechanism 62Z as seen from the side of the +Y-axis direction, and FIG. 6 is a view of the Z-axis feeding mechanism 62Z as seen from the side of the −X-axis direction.

The Z-axis driving portion 61Z performs fine feeding or coarse feeding on the spindle 54. As shown in FIGS. 5 and 6, the Z-axis driving portion 61Z includes clamping portions 531 which are disposed in two places in the column 53 and clamp the spindle 54.

Each of the clamping portions 531 includes a plurality of air pats 531A which are disposed to be opposed to the four faces of the spindle 54. The air pats 531A blow air against the spindle 54 to reduce required driving force of the Z-axis driving portion 61Z which is exerted for moving the spindle 54.

The Z-axis feeding mechanism 62Z includes: a columnar feeding shaft 624 which is placed between the column 53 and the spindle 54 and is extended along the Z-axis direction; a feeding-shaft supporting portion 625 which is disposed on the spindle 54 and supports an end portion of the feeding shaft 624 in the +Z-axis direction; and a transmission 7A.

The feeding-shaft supporting portion 625 includes: a supporting portion main unit 626 which is fixed to the spindle 54; a washer 627 which is fixed to the end portion of the feeding shaft 624 in the +Z-axis direction; a washer 628 which is fixed to a position where is separated from the washer 627 by a certain distance in −Z-axis direction; and a spring 629 which is disposed on the feeding shaft 624 and is placed between the supporting portion main unit 626 and the washer 628.

A through hole (not shown) is passed in the supporting portion main unit 626. The through hole is passed through the main unit along the Z-axis direction and also passed through the feeding shaft 624. The through hole is formed so as to be wider in the X-axis direction. Therefore, the feeding shaft 624 is supported by the feeding-shaft supporting portion 625 so as to be swingable in the X-axis direction.

Figure 7:
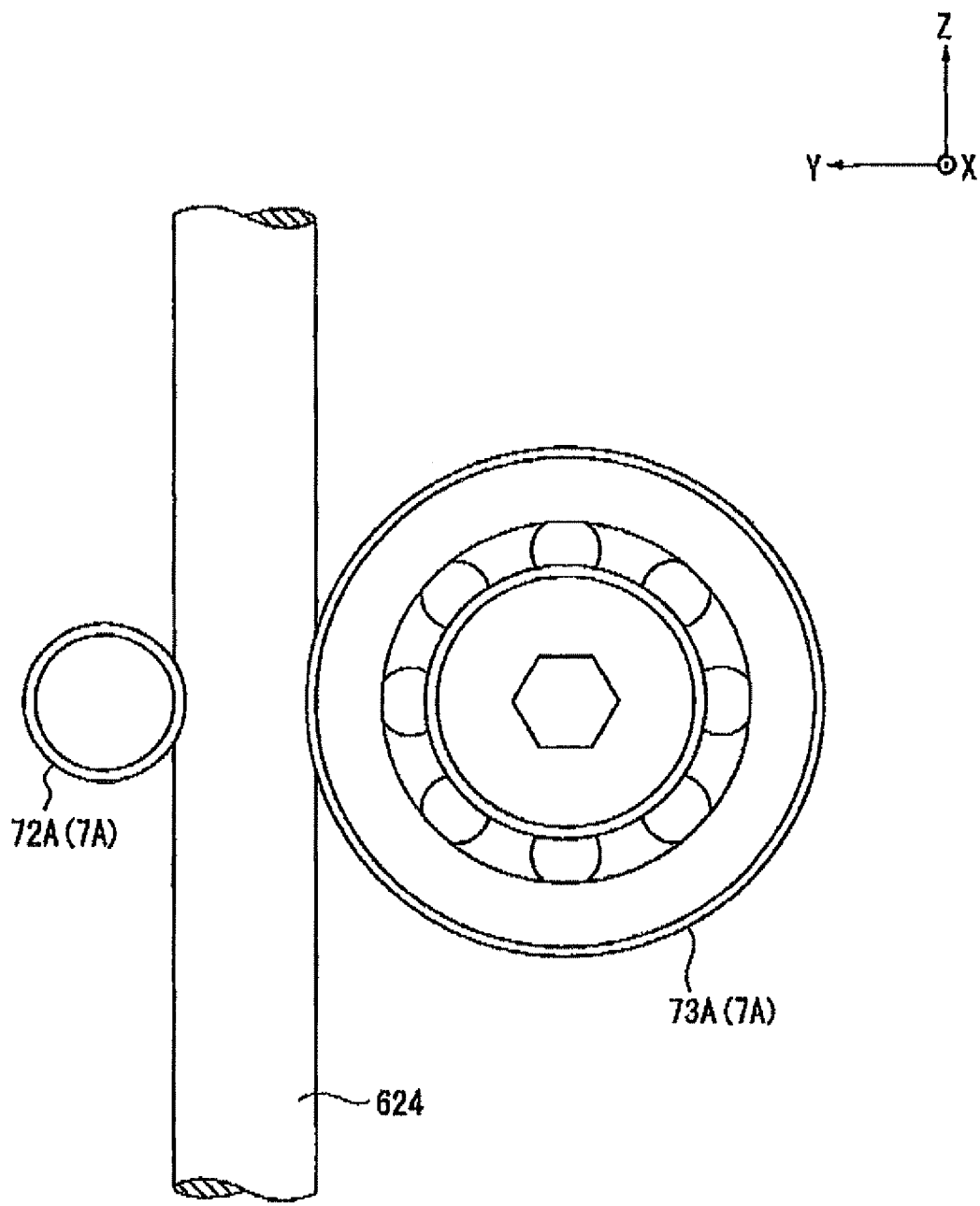
FIG. 7 is an enlarged view showing a connection state of a feeding shaft and the transmission of the embodiment.

FIG. 7 is an enlarged view showing a connection state of the feeding shaft 624 and the transmission 7A.

As shown in FIGS. 5 to 7, the transmission 7A includes: an output shaft 72A which is rotated in accordance with rotation of the handle 71 and has a substantially columnar shape; and a ball bearing 73A which is opposed to the output shaft 72A in a radial direction and has a rotation axis that is substantially parallel to the rotation axis of the output shaft 72A. A recess which is held to the surface of the feeding shaft 624 and has a semicircular sectional shape is formed in the output shaft 72A and the ball bearing 73A. In the transmission 7A, the output shaft 72A and the ball bearing 73A clamp the feeding shaft 624, thereby connecting the transmission to the feeding shaft 624. When the output shaft 72A is rotated in accordance with the rotation of the handle 71, the ball bearing 73A is also rotated in accordance with the rotation of the output shaft 72A, and the spindle 54 is moved along the Z-axis direction.

The transmission 7A is configured in the same manner as the transmission 7 except the shapes of the output shaft 72A and the ball bearing 73A. Hereinafter, the structures of the transmissions 7, 7A will be described in detail by referring to the transmission 7.

[Detailed Structure of Transmission]

Figure 8:
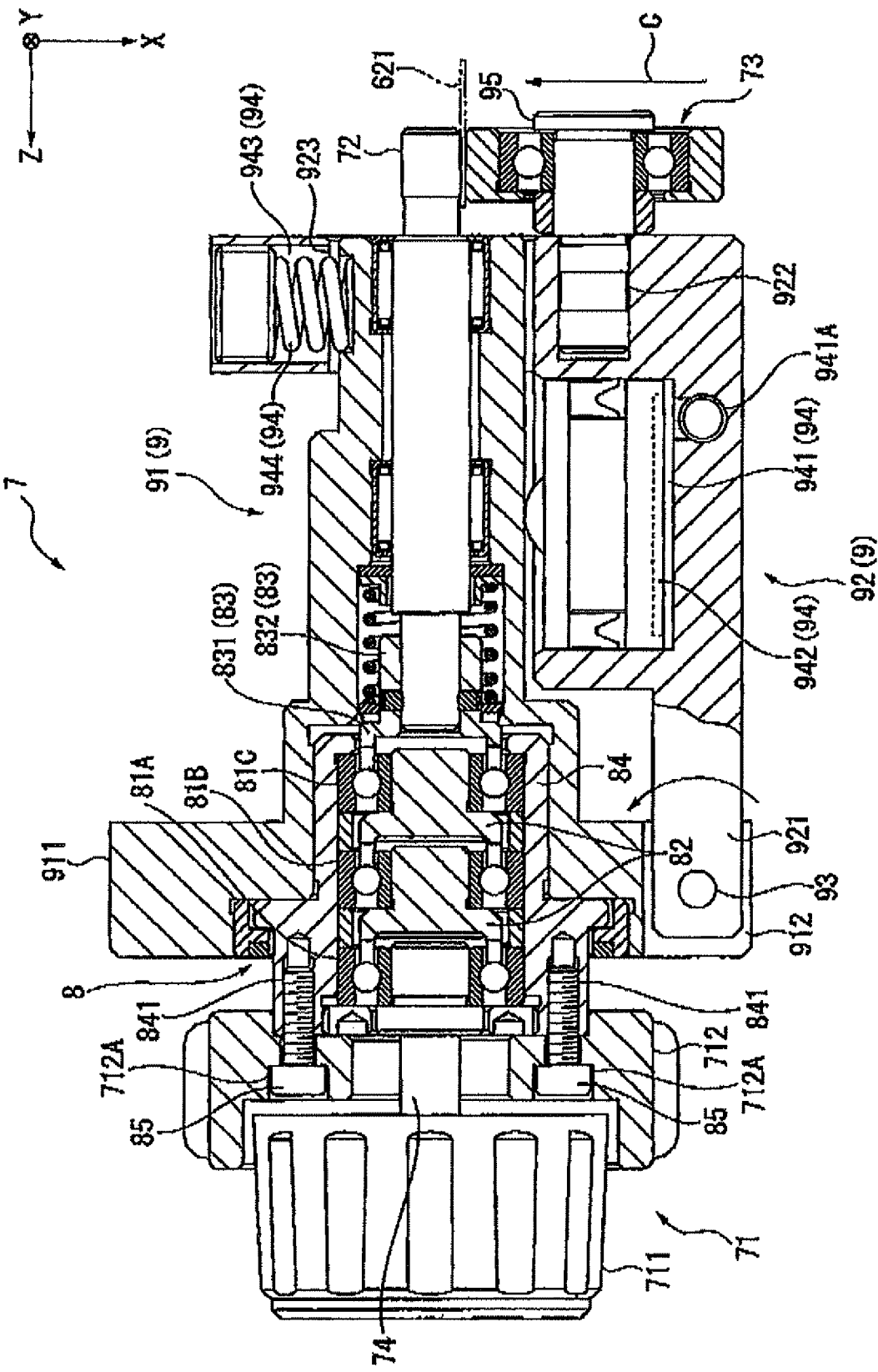
FIG. 8 is a sectional view showing detailed structure of the transmission of the embodiment.

FIG. 8 is a sectional view showing detailed structure of the transmission 7.

As described above, the transmission 7 includes the handle 71. As shown in FIG. 8, the handle 71 is configured by a fine movement handle 711 for finely moving the output shaft 72, and a coarse movement handle 712 for coarsely moving the output shaft 72.

In addition to the handle 71, the output shaft 72, and the ball bearing 73, the transmission 7 further include: an input shaft 74 which is connected to the fine movement handle 711; a speed variation unit 8 which is disposed between the output shaft 72 and the input shaft 74; and an outer case 9.

The speed variation unit 8 includes: three ball bearings 81A, 81B, 81C which are opposingly arranged in the rotation axis direction and function as rolling bearings; two link holding members 82 which are disposed between the ball bearings 81A, 81B, 81C; an output holding member 83 to which the output shaft 72 is connected; and a covering member 84 which covers the ball bearings 81A, 81B, 81C.

Figure 9:
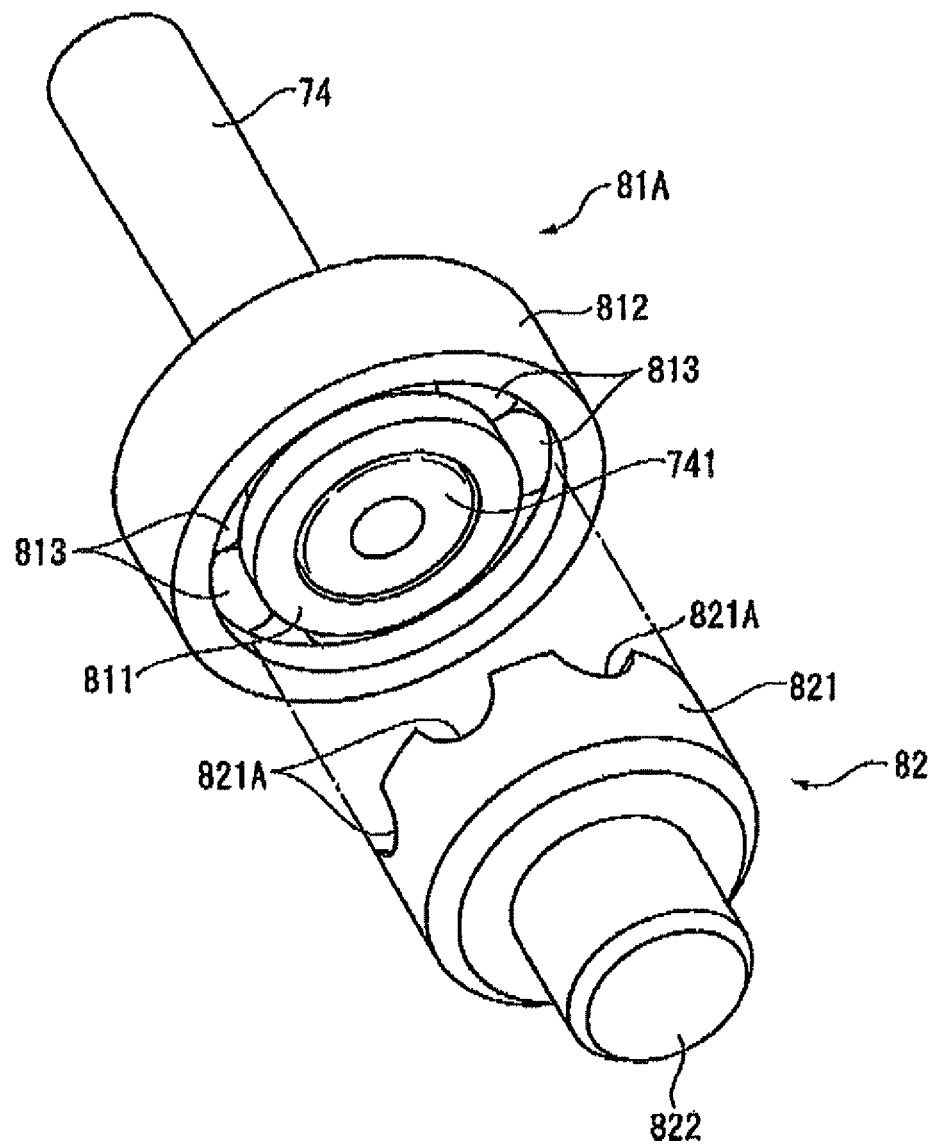
FIG. 9 is a perspective view showing connection states of an input shaft, a ball bearing, and a link holding member of the embodiment.

FIG. 9 is a perspective view showing connection states of the input shaft 74, the ball bearing 81A, and the link holding member 82.

As shown in FIG. 9, the ball bearing 81A has an inner race 811, an outer race 812, and a plurality of rolling elements 813 which are housed between the inner race 811 and the outer race 812. The other ball bearings 73, 81B, 81C are configured in the same manner as the ball bearing 81A.

The input shaft 74 has an insertion portion 741 which is formed into a substantially columnar shape and is inserted into the inner race 811. The input shaft 74 is rotated about the rotation axis of the ball bearing 81A, thereby rotate the inner race 811. The insertion portion 741 has an outer diameter which is slightly larger than the inner diameter of the inner race 811, and is press-fitted into the inner race 811.

Figure 10:
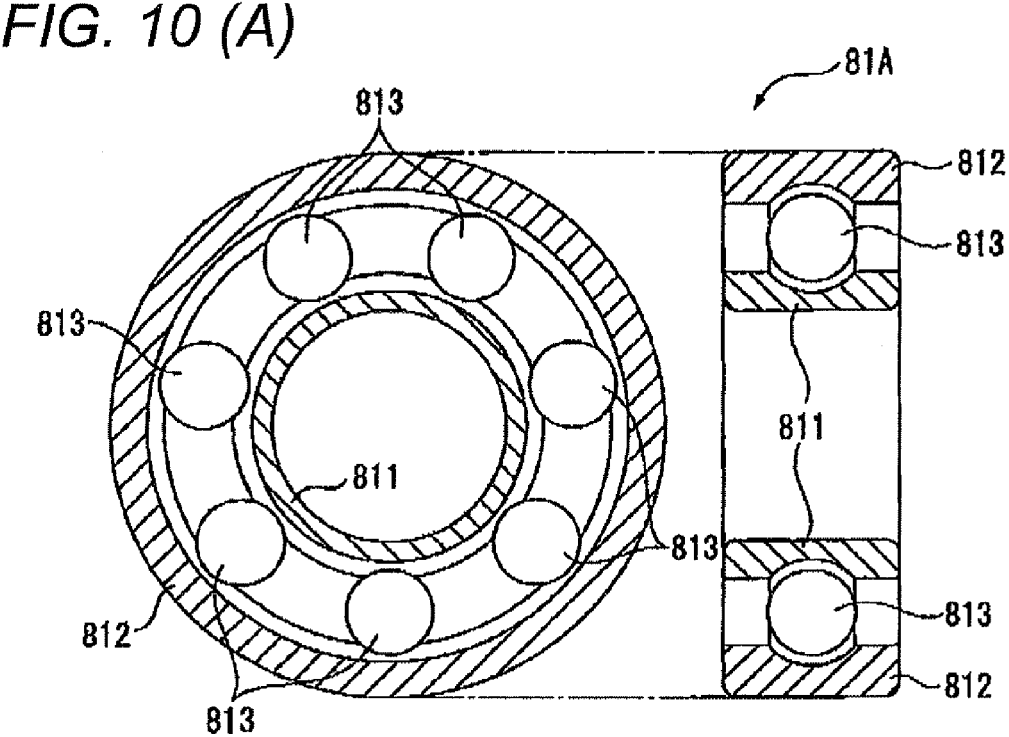
FIGS. 10A and 10B are sectional views a connection state of the input shaft and the ball bearing of the embodiment.
Figure 10:
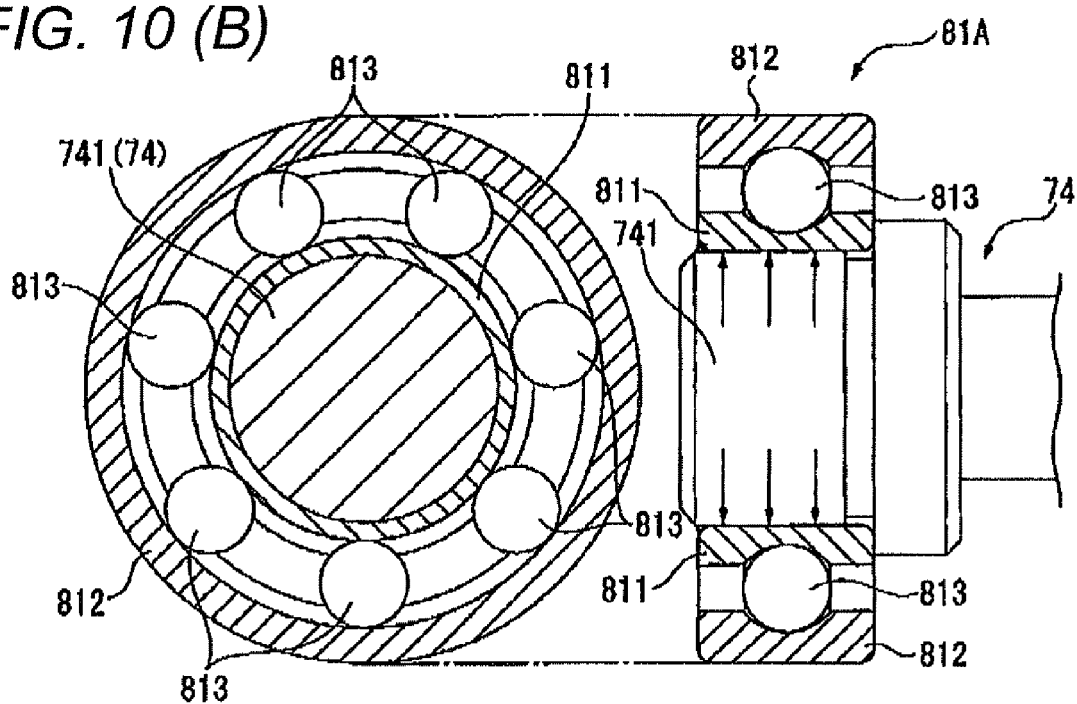

FIGS. 10A and 10B are sectional views of the connection state of the input shaft 74 and the ball bearing 81A. FIG. 10A is a view showing the ball bearing 81A in a state where the input shaft 74 is not inserted. FIG. 10B is a view showing the ball bearing 81A in a state where the input shaft 74 is inserted.

In the ball bearing 81A, as shown in FIG. 10A, a gap which is called a radial gap exists among the inner race 811, the outer race 812, and the rolling elements 813. When the insertion portion 741 is press-fitted into the inner race 811, the rolling elements 813 are pressed by the inner race 811 as shown in FIG. 10B.

Figure 11:
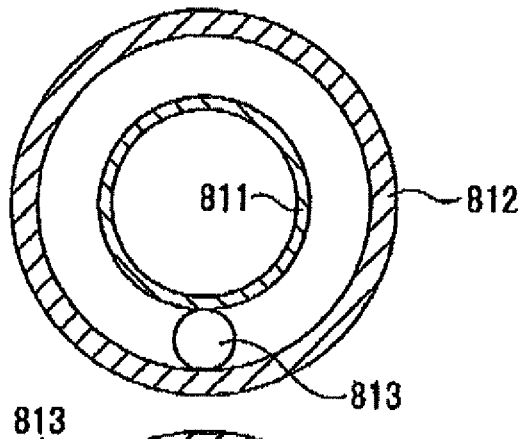
FIGS. 11A to 11D are diagrams showing an example of relationships between rotation of an inner race and rolling of rolling elements.
Figure 11:
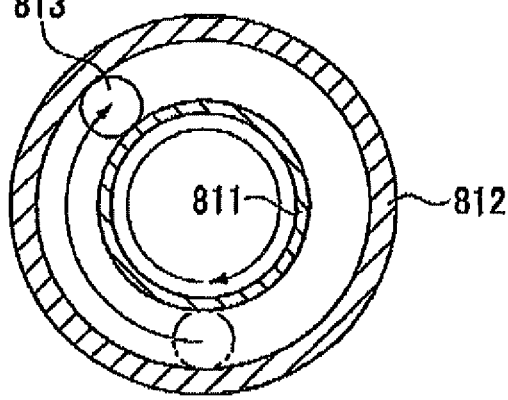
Figure 11:
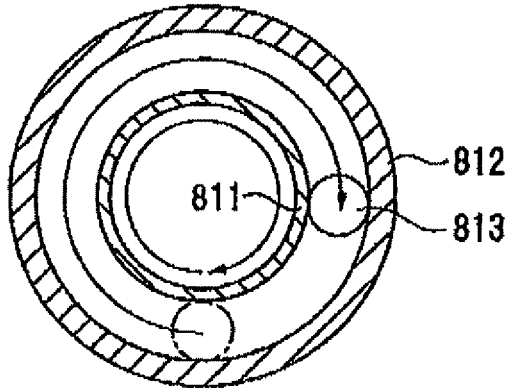
Figure 11:
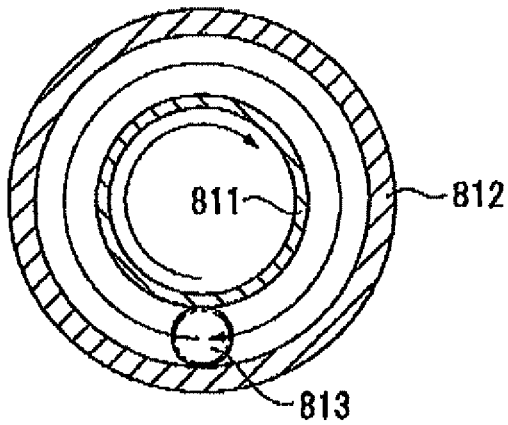

FIGS. 11A to 11D are diagrams showing an example of relationships between the rotation of the inner race 811 and the rolling of the rolling elements 813. FIG. 11A is a view showing the initial state. FIG. 11B is a view showing a state where the inner race 811 makes one rotation. FIG. 11C is a view showing a state where the inner race 811 makes two rotations. FIG. 11D is a view showing a state where the inner race 811 makes three rotations.

As shown in FIGS. 11A to 11D, when the inner race 811 is rotated, the rolling elements 813 roll between the inner race 811 and the outer race 812 in accordance with the rotation of the inner race 811. In this case, the rolling speed of the rolling elements 813 is made lower than the rotational speed of the inner race 811. In the example shown in FIGS. 11A to 11D, when the inner race 811 makes three rotation, for example, the rolling elements 813 makes substantially one revolution. Therefore, the reduction ratio is about 1/3.

The reduction ratio is determined by the diameters of the inner race 811, the outer race 812, and the rolling elements 813. In the embodiment, ball bearings in which the diameters of the inner race 811, the outer race 812, and the rolling elements 813 can be set so that, when the inner race 811 makes approximately 2.63 turns, the rolling elements 813 make one revolution are employed as the ball bearings 81A, 81B, 81C.

As shown in FIGS. 8 and 9, each of the link holding members 82 includes: a holding portion 821 which holds the rolling elements 813 of the ball bearing 81A or 81B; and an insertion portion 822 which is inserted into the inner race 811 of the other ball bearing 81B or 81C. Each of the link holding members 82 is rotated about the rotation axis of the one ball bearing 81A or 81B in accordance with rolling of the rolling elements 813, thereby rotating the inner race 811 of the other ball bearing 81B or 81C.

The holding portion 821 is formed into a cylindrical shape, and semicircular cutaway portions 821A are formed at positions which are opposed to the rolling elements 813, respectively.

In a similar manner as the insertion portion 741 of the input shaft 74, the insertion portion 822 has an outer diameter which is slightly larger than the inner diameter of the inner race 811, and is press-fitted into the inner race 811.

The output holding member 83 includes: a holding portion 831 which is configured in the manner as the holding portions 821 of the link holding members 82 and is held by the rolling elements 813 of the ball bearing 81C; and a fixing portion 832 in which the output shaft 72 is housed and fixed in a state where the rotation axis of the ball bearing 81C is made substantially coincident with the center axis of the output shaft 72. The output holding member 83 is rotated about the rotation axis of the one ball bearing 81C in accordance with rolling of the rolling elements 813, whereby the output shaft 72 is rotated about the rotation axis of the ball bearing 81C.

The covering member 84 is formed into a substantially cylindrical shape which covers the outer race 812 and integrated with the outer races 812 through an adhesive agent. Two screw holes 841 which are formed along the Z-axis direction are disposed in an end portion of the covering member 84 in +Z-axis direction. In the coarse movement handle 712, through holes 712A are formed at positions opposed to the screw holes 841, respectively. Screws 85 are screwed to the screw holes 841 through the through holes 712A, whereby the coarse movement handle 712 and the covering member 84 are integrated with each other.

The outer case 9 includes an outer-case body 91 which is formed into a cylindrical shape that partly covers the speed variation unit 8 and the output shaft 72, and a bearing supporting member 92 which rotatably supports the ball bearing 73.

The outer-case body 91 includes a large-diameter portion 911 which is formed in an end portion in the +Z-axis direction, and a rectangular parallelepiped attaching portion 912 which is disposed in an end portion of the large-diameter portion 911 in the +X-axis direction, to which the bearing supporting member 92 is attached.

The bearing supporting member 92 is formed into a columnar shape in which the height direction coincides with the Y-axis direction and has a substantially L-like sectional shape. The bearing supporting member 92 includes: a pair of extended portions 921 which are formed into a plate-like shape that is extended so as to clamp the attaching portion 912 of the outer-case body 91 and is pivotally supported by a pin 93; a clamping mechanism 94 which is used for clamping the feeding tape 621 by the output shaft 72 and the ball bearing 73; a through hole 922 for supporting the ball bearing 73; and a passing hole 923 which is formed along the Z-axis direction and is used for passing through the outer-case body 91.

The through hole 922 is formed along the Z-axis direction in an end portion in the −Z-axis direction. The inner race of the ball bearing 73 is fixed to the through hole via a pin 95. According to the configuration, the ball bearing 73 is rotatably supported by the bearing supporting member 92.

The clamping mechanism 94 includes: an air chamber 941 which is disposed in the bearing supporting member 92 on the side of the +Z-axis direction; a pressing member 942 which is housed in the air chamber 941 and presses the outer-case body 91; a cavity 943 which is disposed in an end portion of the bearing supporting member 92 in the −X-axis direction; and an urging member 944 which is housed in the cavity 943 and urges the outer-case body 91. An air hole 941A through which the air is introduced or discharged from or to the outside is formed in the air chamber 941.

In a state where the air in the air chamber 941 is discharged through the air hole 941A, the pressing member 942 is moved to the side of the +X-axis direction as shown in FIG. 8. In this case, the bearing supporting member 92 is swung with respect to the outer-case body 91 by the urging force of the urging member 944 about the pin 93 in a counterclockwise direction, and the ball bearing 73 is moved to a direction along which the ball bearing approaches the output shaft 72 (arrow C in FIG. 8).

Figure 12:
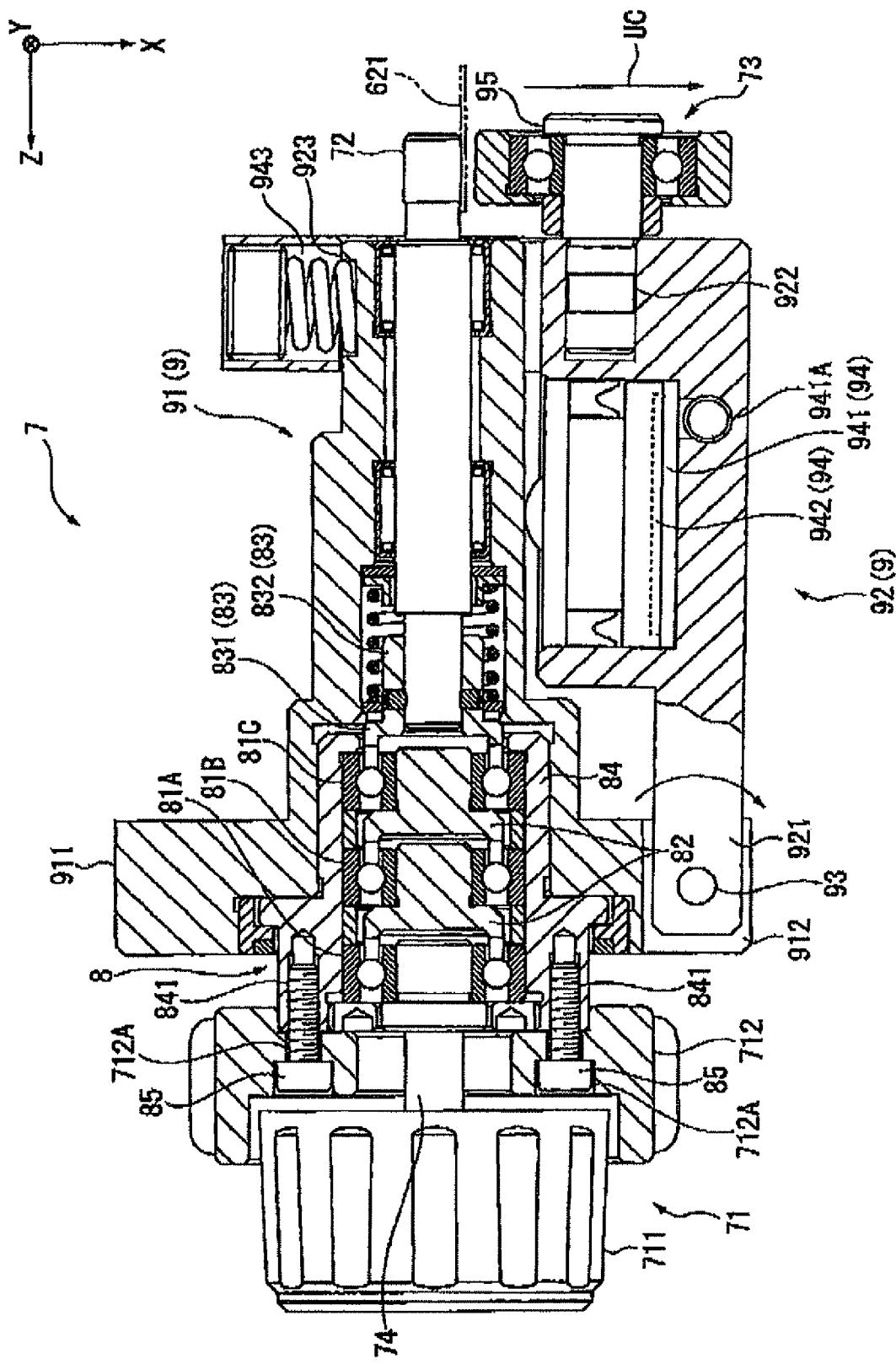
FIG. 12 is a sectional view showing detailed structure of the transmission in a state where air is introduced into an air chamber.

FIG. 12 is a sectional view showing detailed structure of the transmission 7 in a state where the air is introduced into the air chamber 941.

In a state where the air is introduced into the air chamber 941 through the air hole 941A, the pressing member 942 is moved to the side of the −X-axis direction as shown in FIG. 12. In this case, the bearing supporting member 92 is swung with respect to the outer-case body 91 by the pressing force of the pressing member 942 about the pin 93 in a clockwise direction, and the ball bearing 73 is moved to a direction along which the ball bearing separates from the output shaft 72 (arrow UC in FIG. 8).

[Method of Operating Feeding Mechanism]

Next, the method of operating the Y-axis feeding mechanism 62Y will be described. The methods of operating the other feeding mechanisms 62X, 62Z are identical with the method of operating the Y-axis feeding mechanism 62Y.

When the Y-axis feeding mechanism 62Y is operated, the air of the air chamber 941 is discharged by using an air compressor or the like, and the feeding tape 621 is clamped by the output shaft 72 and the ball bearing 73 (see FIG. 8).

When the feeding tape 621 is clamped by the output shaft 72 and the ball bearing 73, the fine movement handle 711 or the coarse movement handle 712 is then rotated.

When the Y-axis feeding mechanism 62Y is not operated, or the beam supporting members 51, the column 53 and the spindle 54 are driven by the driving portions 61X, 61Y, 61Z in accordance with instructions from the host computer connected to the three-dimensional measuring instrument 1, the air is introduced into the air chamber 941, and the output shaft 72 and the ball bearing 73 are separated from each other (see FIG. 12). Therefore, the loads applied to the driving portions 61X, 61Y, 61Z can be reduced.

When the beam supporting members 51 are to be finely moved, the fine movement handle 711 is rotated. When the input shaft 74 is rotated by rotating the fine movement handle 711, the inner race 811 of the ball bearing 81A is rotated in accordance with the rotation of the input shaft 74, and the rolling elements 813 roll between the inner race 811 and the outer race 812 in accordance with the rotation of the inner race 811. Namely, the rotational speed of the input shaft 74 is converted to the rolling speed of the rolling elements 813.

The rolling speed of the rolling elements 813 is made lower than the rotational speed of the input shaft 74. Specifically, a ball bearing in which the diameters of the inner race 811, the outer race 812, and the rolling elements 813 are set so that, when the inner race 811 makes approximately 2.63 turns, the rolling elements 813 make one revolution is employed as the ball bearing 81A, and hence the rolling speed of the rolling elements 813 is about 1/2.63 of the rotational speed of the input shaft 74.

When the rolling elements 813 of the ball bearing 81A roll, the link holding member 82 is rotated about the rotation axis of the ball bearing 81A in accordance with the rolling of the rolling elements 813, and the inner race 811 of the ball bearing 81B is rotated in accordance with the rotation of the link holding member 82. Namely, the rotational speed of the inner race 811 of the ball bearing 81B is about 1/2.63 of the rotational speed of the inner race 811 of the ball bearing 81A (the rotational speed of the input shaft 74).

When the inner race 811 of the ball bearing 81B is rotated, the inner race 811 of the ball bearing 81C is rotated through the link holding member 82. Namely, the rotational speed of the inner race 811 of the ball bearing 81C is about 1/2.63 of the rotational speed of the inner race 811 of the ball bearing 81B.

When the inner race 811 of the ball bearing 81C is rotated, the output shaft 72 is rotated about the rotation axis of the ball bearing 81C in accordance with the rotation of the output holding member 83. Therefore, the rotational speed of the output shaft 72 is about 1/18.2 of the rotational speed of the input shaft 74.

When the diameter of the output shaft 72 is set to 6 mm, for example, the output shaft 72 has a circumference of about 18.85 mm. When the fine movement handle 711 makes one rotation, therefore, the beam supporting members 51 can be finely moved by about 1.036 mm.

Figure 13:
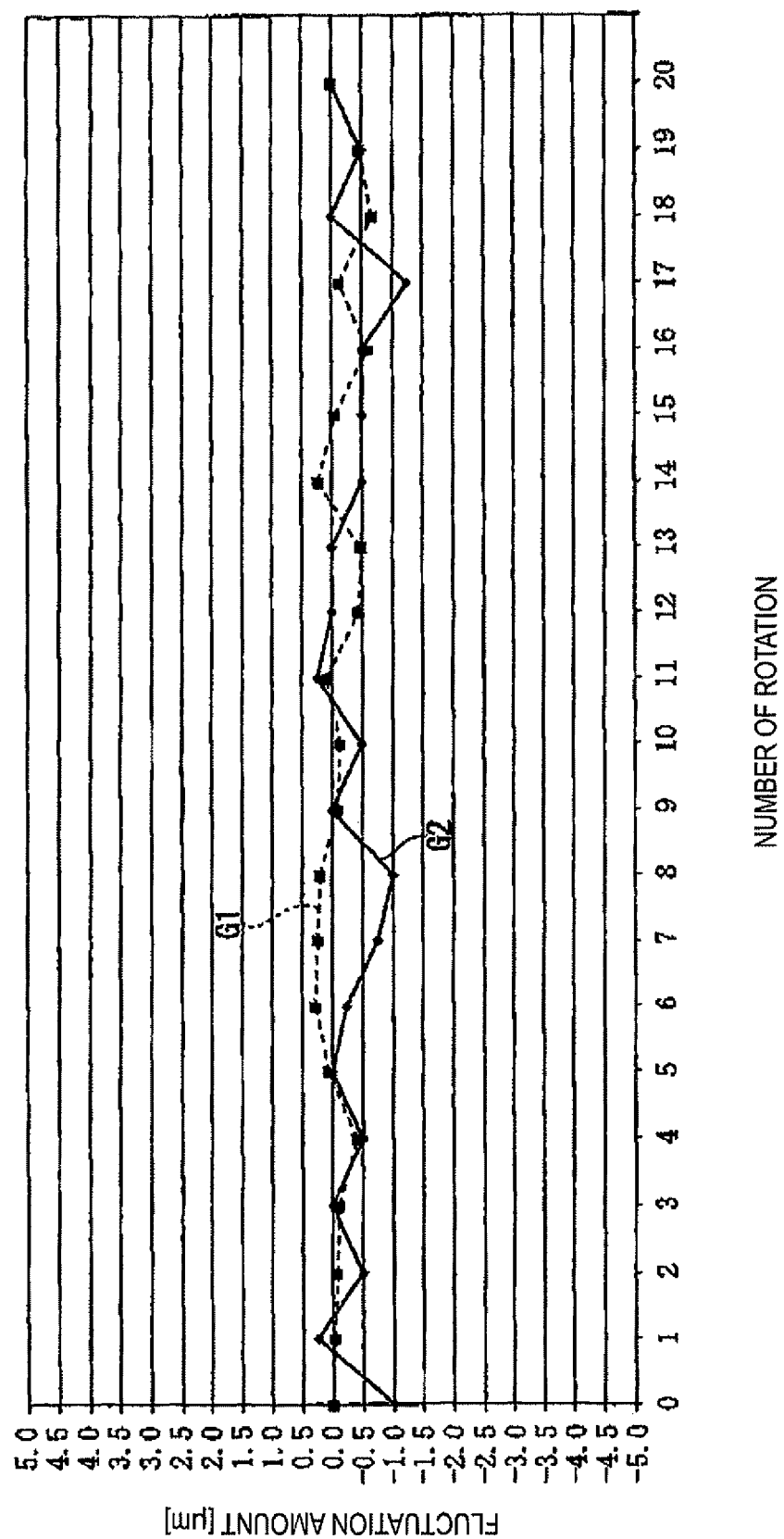
FIG. 13 is a graph showing the positioning sensitivity when a fine movement handle is rotated.
Figure 14:
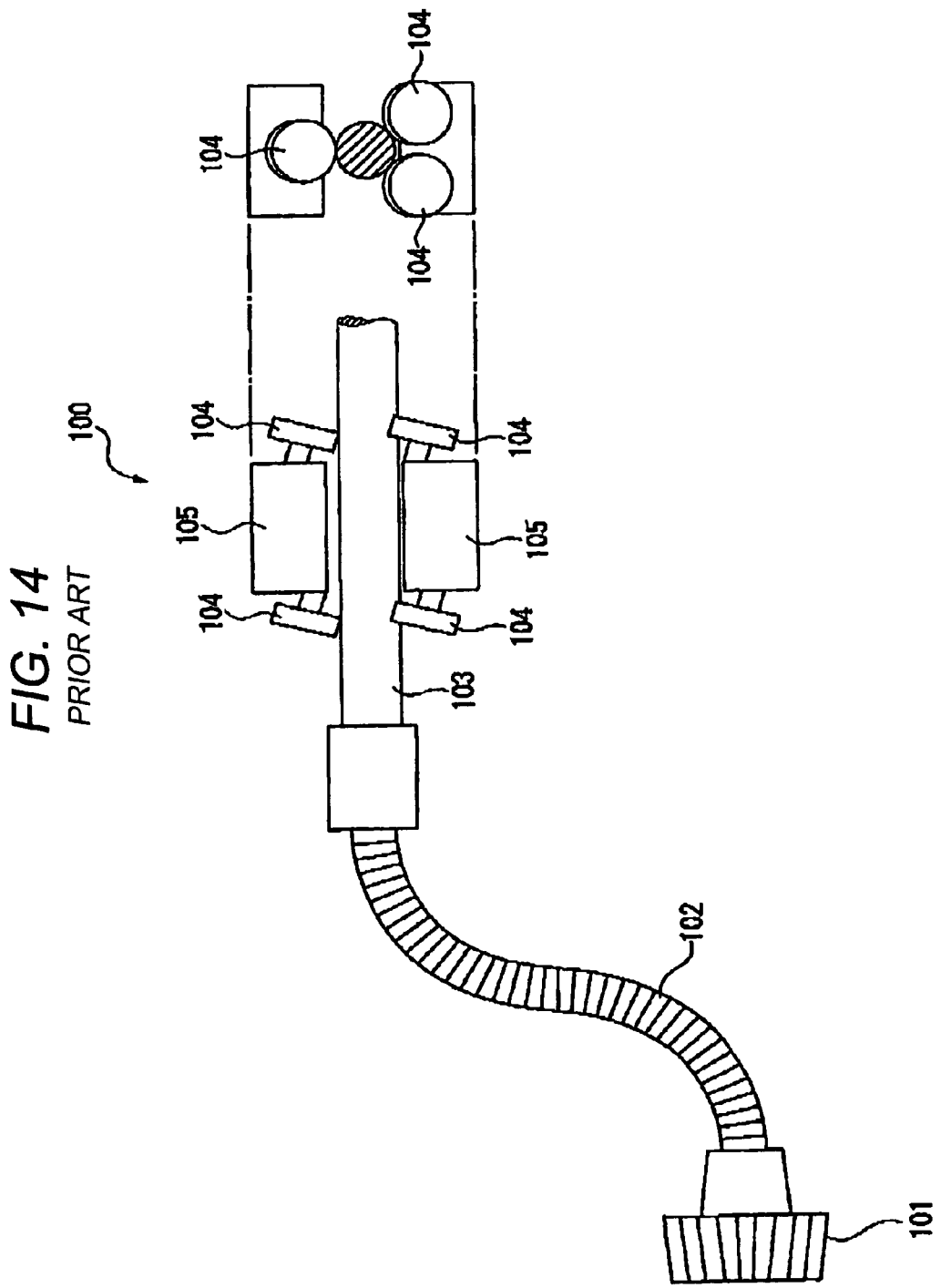
FIG. 14 is a diagram showing a micro-motion mechanism of the linear action type.
Figure 15:
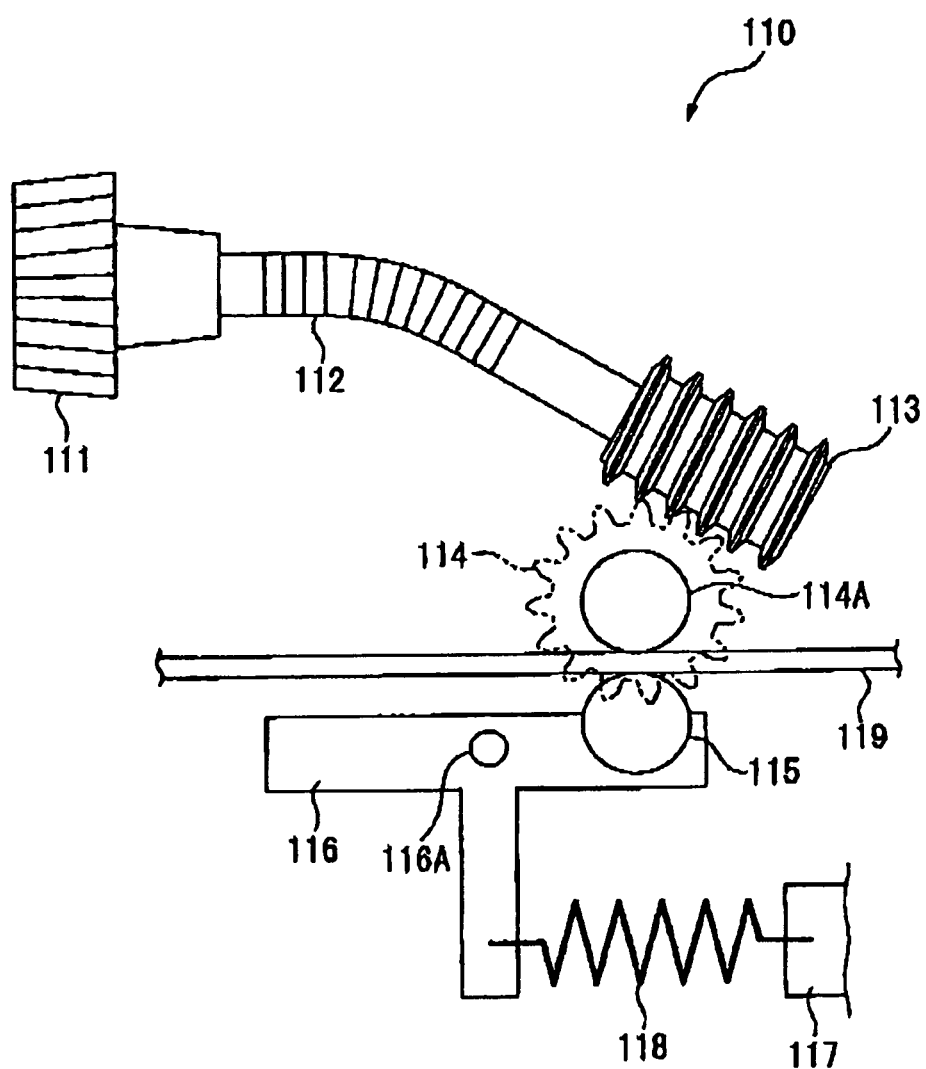
FIG. 15 is a diagram showing a micro-motion mechanism of the worm gear type.

FIG. 13 is a graph showing the positioning sensitivity when the fine movement handle 711 is rotated. In FIG. 13, the abscissa indicates the number of rotations of the fine movement handle 711, and the ordinate indicates a deviation from an expected value at a certain number of rotations. The graph G1 is a graph showing the case where the fine movement handle 711 is rotated in the forward direction, and the graph G2 is a graph showing the case where the fine movement handle 711 is rotated in the reverse direction.

As shown in FIG. 13, the positioning sensitivity when the fine movement handle 711 is rotated is within a range of deviation of about 1.5 μm. When the fine movement handle 711 is rotated in the forward direction and then rotated in the reverse direction, backlash does not occur.

When beam supporting members 51 are coarsely moved, the coarse movement handle 712 is rotated. When the covering member 84 is rotated by rotating the coarse movement handle 712, the outer races 812 of the ball bearings 81A, 81B, 81C are simultaneously rotated in accordance with the rotation of the covering member 84, and the rolling elements 813 roll between the inner races 811 and the outer races 812 in accordance with the rotation of the outer races 812. Namely, the rotational speed of the covering member 84 is converted to the rolling speed of the rolling elements 813.

In this case, the rolling speed of the rolling elements 813 of the ball bearings 81A, 81B, 81C is equal to the rotational speed of the covering member 84. When the rolling elements 813 roll, the output shaft 72 is rotated about the rotation axis of the ball bearing 81C in accordance with the rotation of the output holding member 83. At this time, the rotational speed of the output shaft 72 is equal to the rolling speed of the rolling elements 813 of the ball bearings 81A, 81B, 81C. Therefore, the rotational speed of the output shaft 72 is equal to that of the covering member 84.

When the diameter of the output shaft 72 is set to 6 mm, for example, the output shaft 72 has a circumference of about 18.86 mm. When the coarse movement handle 712 makes one rotation, therefore, the beam supporting members 51 can be coarsely moved by about 18.85 mm.

The above described embodiment achieves following effects.

(1) The output of the transmission 7 or 7A is the rotational output of the output shaft 72 or 72A, and hence it is possible to configure the feeding mechanisms 62X, 62Y, 62Z which are moved along the axial direction of the feeding tape 621 or the feeding shaft 624. Therefore, the size is not increased in accordance with the movable distance. Furthermore, the transmission 7 or 7A can be configured by using the general-purpose ball bearings 81A, 81B, 81C and hence the production cost can be reduced. In the transmission 7 or 7A, moreover, a wire and a gear are not used, and therefore backlash does not occur.

(2) The rotational speed of the input shaft 74 is reduced by each of the ball bearings 81A, 81B, 81C, as compared with the case where the reduction ratio is adjusted by the diameters of the inner race 811, the outer race 812, and the rolling elements 813. Therefore, the reduction ratio can be largely changed.

(3) When the insertion portion 741 or 822 is inserted into the inner race 811, the rolling elements 813 can be pressed by the inner race 811. When the inner race 811 or the outer race 812 is rotated in accordance with the rotation of the input shaft 74 or the covering member 84, therefore, it is possible to suppress the rolling elements 813 from slipping, and the output shaft 72 or 72A can be rotated at an expected reduction ratio.

(4) The covering member 84 is integrated with the outer races 812 of the ball bearings 81A, 81B, 81C, and hence the outer races 812 of the ball bearings 81A, 81B, 81C can be simultaneously rotated by rotating the covering member 84. In the transmission 7 or 7A, therefore, the output shaft 72 or 72A can be finely moved by rotating the input shaft 74, and the output shaft 72 or 72A can be coarsely moved by rotating the covering member 84.

Modifications of Embodiment

The invention is not restricted to the above-described embodiment. Modifications, improvements, and the like within the range where the object of the invention can be attained are included in the invention.

In the above embodiment, for example, the transmission 7 or 7A has the three ball bearings 81A, 81B, 81C which are opposingly arranged in the rotation axis direction. Alternatively, the transmission may be configured by one rolling bearing, or by four or more rolling bearings. When the transmission is configured by one rolling bearing, the link holding members are not necessary.

In the above embodiment, the output shaft 72 or 72A and the output holding member 83 are separately configured. Alternatively, the output shaft and the output holding member may be integrated with each other. In short, the output shaft is requested to be connected to the holding member.

In the above embodiment, the ball bearings 81A, 81B, 81C are employed as rolling bearings. Alternatively, a roller bearing or the like may be employed. In short, the rolling bearing is requested to have an inner race, an outer race, and a plurality of rolling elements.

In the above embodiment, the insertion portion 741 or 822 is press-fitted into the inner race 811. Alternatively, the insertion portion may have an outer diameter which is substantially equal to the inner diameter of the inner race. In a rolling bearing, usually, a radial gap is disposed. Therefore, the configuration of the invention in which the insertion portion is press-fitted into the inner race is preferable.

In the above embodiment, the transmission 7 or 7A has the covering member 84 which is integrated with the outer races 812 of the ball bearings 81A, 81B, 81C. Alternatively, the covering member may be integrated with one of ball bearings. The transmission may not include a covering member.

In the above embodiment, the transmission 7 or 7A is mounted on the three-dimensional measuring instrument 1 which includes the measuring element 2A and the moving mechanism 3. Alternatively, the transmission may be mounted on another measuring instrument, a machine tool, or the like.

What is claimed is:

1. A transmission comprising:
a bearing comprising an inner race, an outer race, and a plurality of rolling elements housed between the inner race and the outer race, the outer race not being subject to spring-induced pressure;
an input shaft which has an insertion portion inserted into the inner race and is rotated about a rotation axis of the rolling bearing and rotates the inner race;
a holding member which comprises a holding portion held by the rolling elements and is rotated about the rotation axis in accordance with rolling of the rolling elements;
an output shaft which is connected to the holding member and is rotated about the rotation axis in accordance with rotation of the holding member;
a clamping mechanism connected to a supporting member, the clamping mechanism including a pressing member and a spring member, the clamping mechanism exerting pressure on an outer end of the output shaft;
a ball bearing being opposed to the output shaft in a radial direction, the ball bearing having a rotational axis substantially parallel to the rotational axis of the output shaft, the ball bearing and the output shaft clamping a feeding tape which connects the transmission to the feeding tape,
wherein when the output shaft is rotated, the ball bearing is also rotated, thereby moving a beam supporting member along a direction perpendicular to the rotational axis of the output shaft.

2. The transmission according to claim 1,
wherein a plurality of the rolling bearings are provided so as to oppose each other in the rotation axis,
the holding member comprises:
an output holding member to which the output shaft is connected; and
link holding members which are provided among the rolling bearings,
wherein each of the link holding members comprises:
a holding portion which holds the rolling elements of one of the opposing rolling bearings; and
an insertion portion which is inserted into the inner race of the other of the opposing rolling bearing, and
wherein each link holding member is rotated about the rotation axis and rotates the inner race of the other of the opposing rolling bearing.

3. The transmission according to claim 1, wherein:
an outer diameter of the insertion portion is slightly larger than an inner diameter of the inner race, and
the insertion portion is press-fitted into the inner race.

4. The transmission according to claim 1, further comprises
a covering member which has a substantially cylindrical shape so as to cover the outer race and is integrated with the outer race.

5. A measuring instrument comprising:
a measuring element for measuring an object to be measured;
a moving mechanism for moving the measuring element; and
a transmission according to claim 1 which moves the measuring element in accordance with rotation of the output shaft.

* * * * *